United States Patent [19]
Reed et al.

[11] Patent Number: 5,854,714
[45] Date of Patent: Dec. 29, 1998

[54] DIGITAL SERVO DEMODULATION FOR SAMPLED AMPLITUDE MAGNETIC RECORDING

[75] Inventors: David E. Reed, Westminster; William G. Bliss, Thornton, both of Colo.

[73] Assignee: Cirrus Logic, Inc., Fremont, Calif.

[21] Appl. No.: 741,156

[22] Filed: Oct. 29, 1996

Related U.S. Application Data

[62] Division of Ser. No. 325,842, Nov. 14, 1994, Pat. No. 5,668,678.

[51] Int. Cl.$^6$ ........................................... G11B 5/09
[52] U.S. Cl. ..................... 360/51; 375/340; 360/77.08
[58] Field of Search .................. 360/77.08, 32, 360/40, 48, 46, 78.14, 131, 51; 369/32; 375/120, 228, 376, 340; 330/279; 324/614, 76.24; 318/560; 329/311

[56] References Cited

U.S. PATENT DOCUMENTS

| | | | |
|---|---|---|---|
| 4,510,537 | 4/1985 | Yoshida et al. | 360/78.04 |
| 4,783,705 | 11/1988 | Moon et al. | 360/77.08 |
| 4,933,786 | 6/1990 | Wilson | 360/78.14 |
| 4,954,906 | 9/1990 | Nakamura et al. | 360/77.08 |
| 5,065,263 | 11/1991 | Yoshida et al. | 360/77.03 |
| 5,089,757 | 2/1992 | Wilson | 318/560 |
| 5,255,131 | 10/1993 | Coker et al. | 360/48 |
| 5,321,559 | 6/1994 | Nguyen et al. | 360/46 |
| 5,329,554 | 7/1994 | Behrens et al. | 375/340 |
| 5,343,340 | 8/1994 | Boutaghou et al. | 360/77.08 |
| 5,345,342 | 9/1994 | Abbott et al. | 360/48 |
| 5,359,631 | 10/1994 | Behrens et al. | 375/376 |
| 5,384,671 | 1/1995 | Fisher | 360/51 |
| 5,418,670 | 5/1995 | McClure et al. | 360/131 |
| 5,424,881 | 6/1995 | Behrens et al. | 360/40 |
| 5,440,532 | 8/1995 | Yokogawa et al. | 369/32 |
| 5,469,113 | 11/1995 | Steyaert et al. | 360/77.08 X |
| 5,576,906 | 11/1996 | Fisher et al. | 360/77.08 |
| 5,602,692 | 2/1997 | Freitas et al. | 360/77.08 |

OTHER PUBLICATIONS

Mueller, F.E., "Digital Demodulation for Quad–Burst Position Error Signal", *IBM Technial Disclosure Bulletin*, vol. 31, No. 9, Feb. 1989, pp. 159–160.

John Vanderkooy and Stanley P. Lipschitz, "Resolution Below the Least Significant Bit in Digital Systems with Dither," *J. Audio Eng. Soc.*, vol. 32, No. 3, Mar. 1984.

*Primary Examiner*—Aristotelis M. Psitos
*Assistant Examiner*—Patrick Wamsley
*Attorney, Agent, or Firm*—Howard H. Sheerin; Dan A. Shifrin

[57] ABSTRACT

A discrete time servo demodulation technique incorporated within a sampled amplitude read channel to demodulate embedded servo field information stored on a magnetic medium. The servo field information is transduced by a read head into an analog signal, and converted to a sequence of sample values in the read channel. The demodulation technique is responsive to the sample values and includes a discrete time peak detector for detecting servo data, and a discrete time servo burst amplitude detector for measuring the amplitude of servo bursts. Peaks are detected in the analog read signal by sensing a change of slope from the sequence of sample values. The peaks are qualified by polarity in that a peak is detected only if its polarity is opposite in sign from the previous peak. The servo burst amplitudes are measured by interpolating, rectifying, and accumulating the sequence of sample values corresponding to the servo bursts. A plurality of registers store the amplitude measurement of corresponding servo bursts such as the four servo bursts in a quadrature system. The sample values are interpolated, squared, and the sampling frequency dithered in order to decrease the sensitivity of the burst amplitude measurement to variations in the sampling phase and to increase the effective resolution of the read channel ADC for servo demodulation. Control signals are generated in response to the detected servo data which are transferred to a servo controller over a fully digital interface, thus obviating the analog-to-digital converter found in conventional servo controllers.

29 Claims, 10 Drawing Sheets

DIGITAL SERVO DEMODULATION FOR SAMPLED AMPLITUDE MAGNETIC RECORDING

This application is a division of application Ser. No. 08/325,842, filed Nov. 14, 1994, now U.S. Pat. No. 5,668,678.

FIELD OF INVENTION

The present invention relates to computer technology and, more specifically, to servo burst digital demodulation in a sampled amplitude read channel for positioning a read head to retrieve digitized data from a magnetic storage medium.

This application is related to U.S. patents, namely U.S. Pat. No. 5,424,881 entitled "Synchronous Read Channel," U.S. Pat. No. 5,359,631 entitled "Timing Recovery Circuit for Synchronous Waveform Sampling," U.S. Pat. No. 5,291,499 entitled "Method and Apparatus for Reduced-Complexity Viterbi-Type Sequence Detectors," U.S. Pat. No. 5,297,184 entitled "Gain Control Circuit for Synchronous Waveform Sampling," and U.S. Pat. No. 5,329,554 entitled "Digital Pulse Detector." All of the above-named patents are assigned to the same entity, and all are incorporated herein by reference.

This application is related to other co-pending U.S. patent applications, namely application Ser. No. 07/954,350 entitled "Timing Recovery Circuit for Synchronous Waveform Sampling," Ser. No. 08/012,266 entitled "Synchronous read channel," Ser. No. 08/236,719 entitled "Method and Apparatus for Calibrating a PRML Read Channel Integrated Circuit," Ser. No. 08/340,939, now U.S. Pat. No. 5,754,353 entitled "Channel Quality Circuit In A Sampled Amplitude Read Channel," and Ser. No. 08/701,572, now U.S. Pat. No. 5,754,352 entitled "Improved Timing Recovery For Synchronous Partial Response Recording." This application is also related to several U.S. patents, namely U.S. Pat. No. 5,291,499 entitled "Method and Apparatus for Reduced-Complexity Viterbi-Type Sequence Detectors," U.S. Pat. No. 5,297,184 entitled "Gain Control Circuit for Synchronous Waveform Sampling," and U.S. Pat. No. 5,329,554 entitled "Digital Pulse Detector." All of the above-named patent applications and patents are assigned to the same entity, and all are incorporated herein by reference.

BACKGROUND OF THE INVENTION

In magnetic storage systems, a transducing head writes digital data onto a magnetic storage medium. The digital data serve to modulate the current in a read/write head coil so that a sequence of corresponding magnetic flux transitions are written onto the magnetic medium in concentric tracks. To read this recorded data, the read/write head passes over the magnetic medium and transduces the magnetic transitions into pulses in an analog signal. These pulses are then decoded by the read channel circuitry to reproduce the digital data.

Decoding the pulses into a digital sequence can be performed by a simple pulse detector in a conventional analog read channel or, as in more recent designs, by using a discrete time sequence detector in a sampled amplitude read channel. Discrete time sequence detectors are preferred over simple analog pulse detectors because discrete time detectors compensate for intersymbol interference (ISI), thereby decreasing the necessary bandwidth. Thus, more data can be stored on the storage medium. There are several types of well known discrete time sequence detection methods including discrete time pulse detection (DSP), maximum likelihood sequence detection (MLSD), decision-feedback equalization (DFE), enhanced decision-feedback equalization (EDFE), and fixed-delay tree-search with decision-feedback (FDTS/DF).

The application of sampled amplitude techniques to digital communication channels is well documented. See Y. Kabal and S. Pasupathy, "Partial Response Signaling", *IEEE Trans. Commun. Tech.*, Vol. COM-23, pp.921–934, Sept. 1975; and Edward A. Lee and David G. Messerschmitt, "Digital Communication", Kluwer Academic Publishers, Boston, 1990; and G. D. Forney, Jr., "The Viterbi Algorithm", *Proc. IEEE*, Vol. 61, pp. 268–278, March 1973. Applying sampled amplitude techniques to magnetic storage systems is also well documented. See Roy D. Cideciyan, Francois Dolivo, Walter Hirt, and Wolfgang Schott, "A PRML System for Digital Magnetic Recording", *IEEE Journal on Selected Areas in Communications*, Vol. 10 No. 1, January 1992, pp.38–56; and Wood et al, "Viterbi Detection of Class IV Partial Response on a Magnetic Recording Channel", *IEEE Trans. Commun.*, Vol. Com-34, No. 5, pp. 454–461, May 1986; and Coker Et al, "Implementation of PRML in a Rigid Disk Drive", *IEEE Trans. on Magnetics*, Vol. 27, No. 6, Nov. 1991; and Carley et al, "Adaptive Continous-Time Equalization Followed By FDTS/DF Sequence Detection", *Digest of The Magnetic Recording Conference*, Aug. 15–17, 1994, pp. C3; and Moon et al, "Constrained-Complexity Equalizer Design for Fixed Delay Tree Search with Decision Feedback", *IEEE Trans. on Magnetics*, Vol. 30, No. 5, Sept. 1994; and Abbott et al, "Timing Recovery For Adaptive Decision Feedback Equalization of The Magnetic Storage Channel", *Globecom'90 IEEE Global Telecommunications Conference* 1990, San Diego, Calif., Nov. 1990, pp.1794–1799; and Abbott et al, "Performance of Digital Magnetic Recording with Equalization and Offtrack Interference", *IEEE Transactions on Magnetics*, Vol. 27, No. 1, Jan. 1991; and Cioffi et al, "Adaptive Equalization in Magnetic-Disk Storage Channels", *IEEE Communication Magazine*, Feb. 1990; and Roger Wood, "Enhanced Decision Feedback Equalization", *Intermag'90*.

In disk drives utilizing either analog or sampled amplitude read channels, the read/write head is normally mounted on an actuator arm which is positioned by means of a voice coil motor ("VCM"). The VCM moves the head and actuator arm assembly across the disk surface at a very high speed to perform seek operations in which the head is positioned over a selected data track. The VCM also maintains the head over a selected track while reading or writing information. A servo system controller is the subsystem of the disk drive which is responsible for providing the head positioning necessary for reading and writing information in response to requests from a computer to which the disk drive is connected.

Along each track, the magnetic data is arranged consecutively about a centerline of the tracks. The data is generally organized into sectors or fields of predetermined length. A field of information is often preceded by a field of control information that may be used to verify the position of the head before a subsequent read or write operation. The data information fields may also include an error correction code ("ECC") which aids in correcting errors that may occur when information is read. In embedded servo disk drives, position verification and control information is contained in a servo field which is recorded on the tracks at the time of manufacture, utilizing a high precision servo writer or other techniques. The servo field information is used to perform continuous on-track positioning of the head with respect to the centerline of the track by reading and responding to the control information contained within the servo fields. The servo fields are interspersed with data fields in which the data information is recorded.

The servo control information typically includes a preamble which demarks the beginning of a servo field, a servo address mark ("SAM") which indicates that a valid servo field has been detected, a servo synch mark ("SSM") which is utilized to establish and maintain synchronization over reading and writing operations, an index mark which indicates a single reference point common to all the tracks or a band of tracks on the disk and a track number code, which is a Gray coded integer value of the track currently spanned by the read/write head.

The embedded servo field also typically includes off-track burst information which is written on the track when the disk drive is manufactured. The off-track bursts, which also comprise magnetic pulses, are physically positioned at precise intervals and locations with respect to the various track centerlines to provide the servo system controller with information relative to the fractional track-to-track displacement of the head with respect to a given track centerline. Normally, there are four off-track bursts, and the information obtained by reading the burst is sometimes referred to as quadrature signals, quadrature information or quadrature data. In the typical disk drive, the quadrature data is utilized by a data processor associated with a servo system controller to generate, calculate and provide control signals to the VCM to accurately position the head over the track centerline.

The servo control information in the servo field is commonly extracted from the head's signal, in conventional analog read channels, by an analog circuit which detects the presence of individual pulses. For example, U.S. Pat. No. 4,783,705 discloses an analog pulse detector circuit which detects peaks in the analog signal from the head (whether positive or negative in amplitude). These amplitude signals are then converted to digital signals and then passed to a servo controller. This technique is susceptible to noise in the channel and can erroneously detect two consecutive positive or negative pulses when, in magnetic recording, the pulses normally occur with alternating polarity.

Also in conventional analog read channels, the servo burst information in the servo field is typically extracted using an analog circuit that measures the servo burst amplitudes. These servo burst amplitudes are then processed by a motion control processor which generates control signals for positioning the read/write head. Typically, the amplitude of the off-track bursts is measured with analog peak detectors, which respond to the maximum of the head signal. Alternatively, the off-track bursts may be measured by analog area detectors (as in U.S. Pat. No. 4,783,705) which respond to the integrated amplitude of the head signal. In either case, the conventional burst amplitude measurement is generated by analog circuits and passed as an analog signal from a read channel integrated circuit ("IC") to an additional ADC in a separate servo controller.

Such conventional analog techniques for servo demodulation are inefficient for use in sampled amplitude read channels such as PRML read channels. Sampled amplitude read channels operate with discrete time circuits (and commonly digital circuits) which, being programmable, are highly configurable and adaptable. It is inefficient to incorporate the conventional analog servo demodulation circuits into a sampled amplitude read channel when programmable discrete time techniques can be implemented instead.

Further, the discrete time circuitry already incorporated within a sampled amplitude read channel, such as an analog-to-digital converter and discrete time pulse detector, can also be used to implement demodulation of the servo data. Sharing the discrete time circuitry is a more cost effective implementation of servo demodulation since it requires less die area and less power. Finally, the prior art analog servo demodulation systems incorporated within a read channel cannot be programmably adapted to operate according to the various disk drives, data densities, and magnetic media found in the market. Nor can the prior art demodulation systems be programmably adapted to compensate for changes in the disk drive that occur over time.

Although for sampled amplitude read channels it is more economical to implement servo demodulation using discrete time circuitry, there are drawbacks which are overcome by the present invention. For example, the discrete time burst amplitude measurements are subject to inaccuracies due to variations in the sampling phase. Also, the burst amplitude measurement is subject to inaccuracies due to inconsistent timing of the burst detection signal. Further, the resolution of the channel ADC is inadequate for that required for servo demodulation.

Thus, a general object of the present invention is to demodulate servo control data in a magnetic storage system utilizing discrete time circuitry. Specifically, it is an object to provide discrete time servo demodulation in a sampled amplitude read channel IC. A further object is to share the discrete time circuitry already incorporated within a sampled amplitude read channel IC with the discrete time servo demodulation technique of the present invention, thereby minimizing the integrated circuitry and associated cost. Still another object is to transfer the servo field data to a servo controller through a wholly digital interface, thereby obviating the servo controller analog-to-digital converter. Yet another object is to implement servo demodulation utilizing programmable circuitry in order to adapt its operation to a particular disk drive system. Still a further object is to prevent the detection of two consecutive positive or negative pulse in the servo data. Another object is to increase the effective resolution of the channel ADC through various digital signal processing techniques. Still another object is to overcome inaccuracies in the burst amplitude discrete time measurement caused by variations in the sampling phase. A final object is to control the timing of the burst amplitude measurement so that the head signal is sampled over an integer number of servo burst cycles.

SUMMARY OF THE INVENTION

The objects of the present invention are achieved by incorporating, within a sampled amplitude read channel IC, a unique apparatus and method for processing servo fields in discrete time. Rather than incorporate analog circuitry into the read channel IC to demodulate the servo fields using conventional analog methods, the servo fields are demodulated in discrete time. The discrete time circuitry of the read channel, such as the analog-to-digital converter and pulse detector, is advantageously shared with the discrete time demodulation technique of the present invention. The analog signal from the read head is converted into a sequence of discrete time sample values and optionally converted to digital values by the ADC of the read channel. The pulse detector of the read channel detects the servo control data of the servo field, and a discrete time area detect circuit measures the amplitude of the servo bursts. These signals are then transferred digitally to a servo controller for positioning the read/write head in response thereto. Thus, the analog-to-digital converter found in a conventional servo controller is obviated.

In the preferred embodiment of the present invention, a digital pulse detection circuit receives an input signal from a discrete time sample generator and supplies signals indicative of a presence and polarity of servo data pulses of a servo information field recorded on a rotating storage medium. The digital pulse detection circuit includes a discrete time peak detector for detecting peaks in the analog head signal represented by the discrete time sample values. The discrete time peak detector includes a discrete time slope detection circuit for detecting a change of slope in the analog head signal. Also, a pulse may be detected only if its polarity is opposite in sign from the polarity of the previous pulse. This makes the pulse detection circuit less susceptible to noise since, in magnetic recording, the pulses always occur with alternating polarity. The pulse detection circuit may be a simple peak detector, or a complex sequence detector, such as a Viterbi sequence detector, for detecting both servo data and user data.

The preferred embodiment of the present invention also includes a discrete time area detection circuit that receives the discrete time sample values and supplies signals indicative of a magnitude of individual ones of a number of bursts in a servo burst segment of a servo information field recorded on the rotating storage medium. The discrete time area detection circuit comprises: a rectifier circuit to rectify the sample values, an accumulator circuit to accumulate a predetermined number of the rectified samples, and a plurality of storage registers corresponding to the servo bursts to store the accumulated samples.

The discrete time servo demodulator circuit of the present invention overcomes servo burst amplitude measurement sensitivity to the timing of the analog signal sampling through digital processing and control. Such otherwise inherent sensitivity is overcome by a combination of novel signal processing techniques. The head signal is sampled over an integer number of servo burst pulses to increase the accuracy of the burst amplitude measurement. This results in high accuracy of the servo burst amplitude measurements by eliminating the variation in area due to mismatch between the area timing and cycle period of the servo burst signal. Additionally, a sweep of the sampling frequency around a nominal frequency further reduces the sensitivity to the sampling phase. Finally, the signal samples are rectified or squared, and interpolated in order to further increase the effective resolution of the channel ADC and to achieve even higher accuracy in the discrete time burst amplitude measurement.

The foregoing, and other features and objects of the present invention and the manner of attaining them will become more apparent, and the invention itself will be best understood by reference to the following description of a preferred embodiment taken in conjunction with the accompanying drawings.

DESCRIPTION OF A PREFERRED EMBODIMENT

Figure 1:
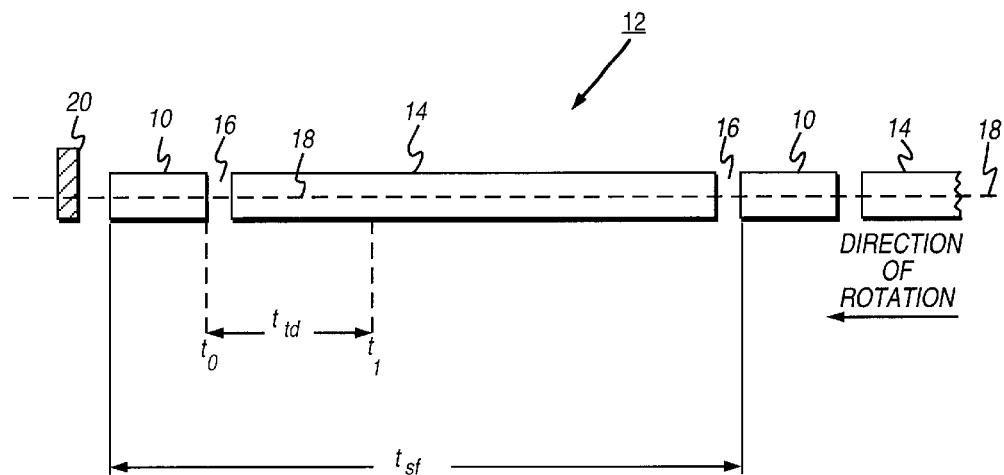
FIG. 1 is a simplified illustration of the organization of alternating servo control information and data information fields, or sectors, disposed along a track centerline of a disk drive and schematically illustrating a read/write head displaced slightly off-track prior to the arrival of a servo data field beneath it.

The features of the present invention interact with and respond to the servo control information contained in a servo field 10 which is embedded or otherwise present in a track 12, as shown in FIG. 1. A plurality of servo fields 10 are located along the track 12, interspersed with a plurality of data fields 14 as shown. The pattern of a servo field 10 and a data field 14 repeats in the direction of rotation of the disk, with the preceding servo field 10 usually being associated with the following data field 14. The adjacent servo fields 10 and data fields 14 may be separated by gaps or transitions 16 as shown, or they may be contiguous to one another and have no transitions delimiting the field boundaries (a situation which is not shown in FIG. 1).

The servo fields 10 and data fields 14 lie along a track center line 18. The dibits which define the information on the track are located linearly along the center line 18. The magnetic reversal or the absence of a magnetic reversal at each physical interval along the length of the track 12 signals the presence of a logical one or a logical zero, respectively.

A conventional transducer or head 20 (shown schematically) reads the dibits from the servo field 10 and the data field 14 on the track 12 over which the head is positioned or writes information to the data fields 14. Generally, the information contained in the servo fields 10 should not be overwritten during use of the disk, thereby ensuring the preservation of the servo field information. A conventional actuator arm (not shown) is connected to the head to suspend and position it over the surface of the disk upon which the tracks 12 of information are located. A conventional voice coil motor ("VCM", not shown) is connected to the actuator arm to move the arm and the attached head 20 to locate the head over a selected track 12.

If the information in the servo and data fields is to be written and read in a reliable manner, the head 20 should be positioned over the center line 18 of the track 12. When the head is not located on the center line 18 of the track, there is a greater risk that the information will not be read or written in a reliable manner, and the risk increases with increasing displacement of the head from the center line 18.

The servo control operation is illustrated in FIG. 1. At time $t_0$, a valid measurement of a position error is obtained by reading information from the servo field 10. At time $t_1$, a control signal in response to the position error is applied to the VCM in order to stabilize movement of the actuator arm and head 20 to the desired position without overshoot or hunting.

Figure 2:
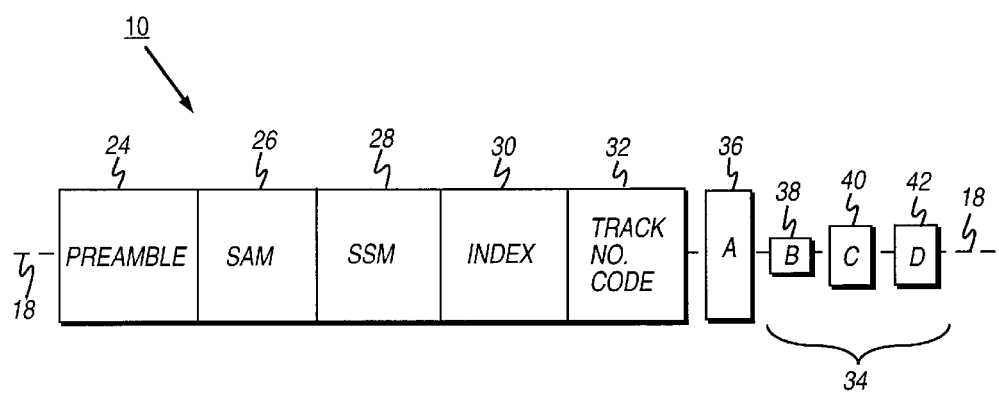
FIG. 2 is a simplified illustration of a typical servo field shown in FIG. 1, showing preamble, SAM, SSM, index mark and track number code portions thereof, as well as off-track bursts for providing fractional off-track servo control information.

More details concerning one possible implementation of the control information contained in the servo field 10 is shown in FIG. 2. The servo field 10 includes a number of subfields 24, 26, 28, 30, 32, and 34. These subfields define a preamble 24, a servo address mark ("SAM") 26, a servo synch mark ("SSM") 28, an index mark 30, a track number code 32, and the servo bursts 34. The preamble 24 (commonly comprised of 2T data: 0,0,1,1,0,0,1,1,0,0, . . . ) delimits the beginning of the servo field 10 and facilitates automatic gain control and timing recovery. The SAM 26 follows the preamble 24 and comprises one or two servo address fields ("SAFs", none of which are specifically shown). The SAM 26 serves to indicate that a valid servo field 10 has been detected and to signal that the SSM 28 will follow. The SSM 28 is an unique pattern of dibits which is used to establish and maintain synchronization between sequential data and servo fields. The SSM 28 is followed by the index mark 30 which indicates a specific position on the track as a whole, usually with respect to a single defined radial position on the disk. The track number code 32 follows and its magnetic transitions form Gray coded information indicative of an integer value representation of the number of the track currently spanned by the read write head 20.

The information in the subfields 24, 26, 28, 30, and 32 of the servo field 10 is the dibit magnetic transitions recorded in the track 12. The position of these dibits is at the center line 18 of the track 12 and results in the creation of information which is binary in nature when read by the head 20, due to the fact that the magnetic transitions are centered about the center line 18. However, the off-track burst subfield 34 generates an analog component of the control signal derived by the head 20 as it passes over a first or "A" off-track burst 36, a second or "B" off-track burst 38, a third or "C" off-track burst 40 and a fourth or "D" off-track burst 42. The dibits of the B, C and D bursts 38–42 are located at positions off of or to the side of the track center line 18. When the dibits of the A, B, C and D bursts 36–42 are read by the head 20, four different analog signals result, depending on the physical position of the head 20 relative to the bursts. The analog nature of the signals derived by the bursts 36, 38, 40 and 42 is represented by different heights of the bursts in the subfield 34 shown in FIG. 2.

Figure 3:
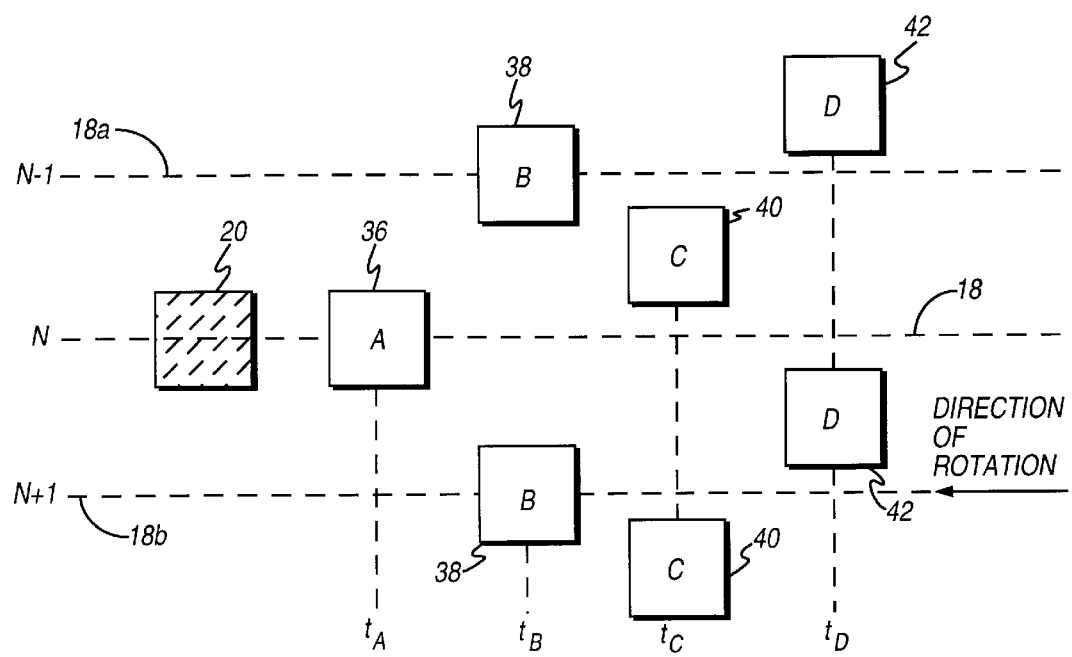
FIG. 3 is a simplified and enlarged illustration of a read/write head (shown in phantom) along a track centerline prior to the off-track servo burst shown in FIG. 2 passing underneath the head due to the rotation of the disk.

The dibit patterns of the off-track bursts 36, 38, 40 and 42 are very accurately positioned or written to the disk surface using a laser interferometer, laser positioning system or other suitable technique. The dibit off-track bursts 36, 38, 40 and 42 are commonly located at predetermined locations with respect to the track center line 18, as shown in FIG. 3. In this example, each track includes a C burst 40 and a D burst 42 positioned adjacent to but on opposite sides of the track center line 18. Each track also includes either an A burst 36 or a B burst 38. For example, each track having an even track number may have an A burst 36, while the odd numbered tracks on each side of the even numbered track include a B burst 38. Track center lines 18a and 18b respectively represent the track numbers N−1 and N+1 of the track number N represented by the center line 18. With the alternating occurrence of the A and B bursts 36, 38 on adjacent tracks 18, and the consistent positional relationship of the C and D bursts 40, 42 on each track 18, there is no overlap or conflict in the position of the bursts on the tracks.

The derivation of the different magnitude analog off-track signals by the head 20 reading the bursts 36, 38, 40 and 42 can be understood by reference to FIG. 3. The head 20 is shown positioned directly above the track center line 18 as the off-track servo bursts 36, 38, 40 and 42 approach due to the rotation of the disk. At time $t_A$, the A burst 36 will pass directly beneath head 20. At time $t_B$, the B bursts 38 from the adjacent track center lines 18a and 18b will pass substantially to sides of the head 20. At time $t_C$, the C burst 40 will pass under approximately one-half of head 20, while at time $t_D$, the D burst 42 will also pass beneath approximately the other one-half portion of head 20.

The dibit magnetic reversals of the bursts 36, 38, 40 and 42 induce alternating electrical signals when the head passes over the bursts. The alternating analog signals are then typically amplified, full-wave rectified, peak detected, and sampled and held in a conventional read write channel (not shown). Alternative techniques, such as integration of the detected analog signals, may be utilized in the read write channel rather than full wave rectification and peak detection.

The analog magnitude of the induced signals corresponds to the extent of the influence of the magnetic dibits on the head 20 as the off-track bursts 34 pass under the head 20. The signals derived from the bursts 36, 38, 40 and 42 are essentially related to the amount of area of the bursts which pass directly underneath the head 20. The amplitude sensed from the off-track bursts 34 will be a maximum when the bursts are in the most direct alignment with head 20. For example, since head 20 is in direct alignment with the center line 18, as shown in FIG. 3 at time $t_A$, a maximum amplitude signal will be derived by the head 20 and held by the read write channel from the A burst 36 passing under the head 20. The relatively high amplitude analog signal results because of the maximum interaction of head 20 with the magnetic transitions of the A burst 36 due to the center line 18 alignment of the head 20 over the A burst 36.

Conversely, the complete off-track alignment of the B bursts 38 results in the head 20 sensing little or no signal from the passage of the B bursts 38 at time $t_B$. As head 20 remains on the center line 18, it will derive an approximately half amplitude signal (relative to the maximum signal) at time $t_C$ from the C burst 40 and an approximately half amplitude signal at time $t_D$ from the D burst 42.

If instead of the example shown in FIG. 3, the head 20 was aligned on one of the adjacent odd numbered tracks 18a or 18b, little or no signal would be derived at time $t_A$ because the head 20 would pass to the sides of the A bursts 36, but a maximum signal would be derived at time $t_B$ because the head 20 would pass directly over the B burst 38 on the track center line 18a or 18b. The signals derived at times $t_C$ from the C burst 40 and at time $t_D$ from the D burst 42 would be approximately one half of the value of the maximum value, as was the situation on the even numbered track.

The signals derived from the A, B, C and D bursts 36–42 on each track 18 are sometimes referred to a quadrature signals or quadrature information. Based on the quadrature signals and the track number, an appropriate control signal may be conveniently derived from the appropriate quadrature signals. Derivation of the control signal is based on the largest one of the quadrature burst signals. It should also be recognized that different patterns and sequences of servo off-track bursts 34 may be employed to detect off-track information other than the above described quadrature control system technique, but the principles described above with respect to the quadrature technique may be adapted to other types of control systems using position defined fields to derive analog signals indicative of the position of the head 20.

Sampled Amplitude Read Channel

Figure 4:
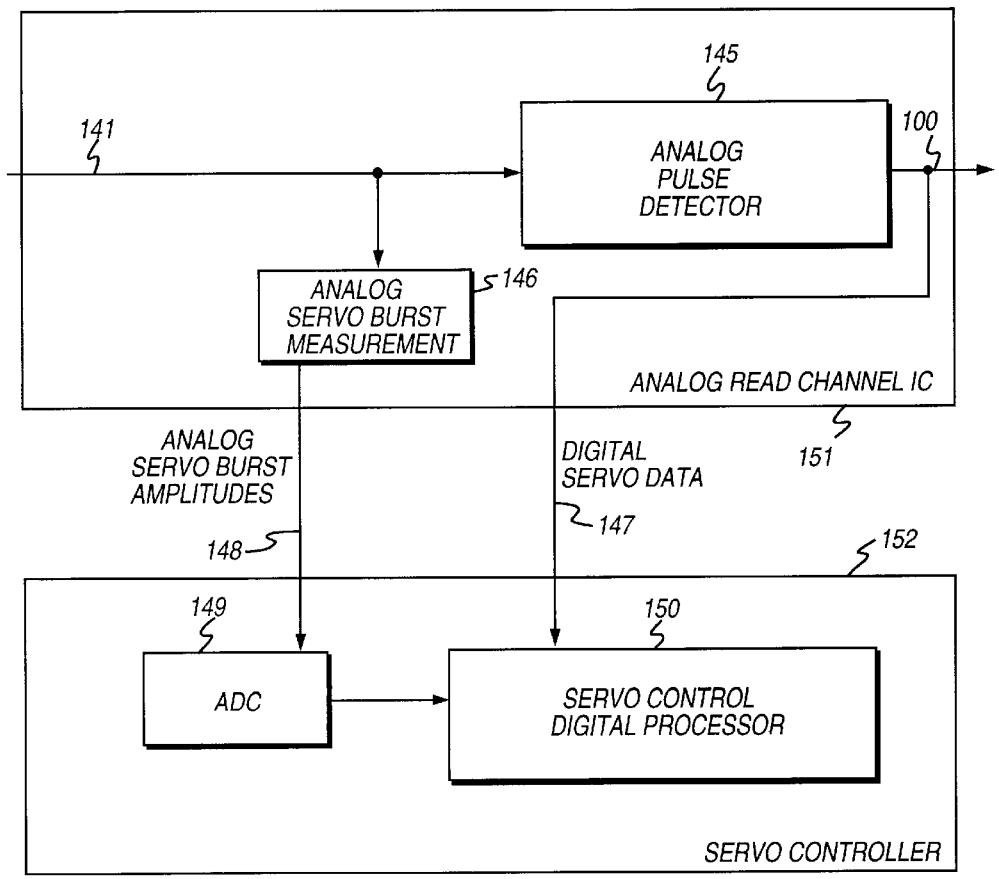
FIG. 4 illustrates a conventional analog read channel and associated servo controller, the former incorporating an analog pulse detector and analog servo burst measurement circuit for providing digital servo data and analog burst signals, respectively, to the servo controller.

With reference now to FIG. 4, a conventional analog peak detector read channel 151 is shown incorporating an analog pulse detector 145 and servo burst area detect 146 circuits to supply signals representative of servo data 147 and servo burst amplitudes 148, respectively, to an associated servo controller 152 incorporating an on-board ADC 149. The head signal appearing on line 141 is supplied to the analog pulse detector 145 for detecting the user data 100 and the servo data 147. The head signal 141 is also supplied to the analog area detect or peak detect 146 circuit for measuring the servo burst amplitudes 148. Digital servo data on line 147 is passed directly to the servo control digital processor 150 from the analog pulse detector 145 while an analog signal representative of the burst amplitudes on line 148 is passed to the ADC 149 of the servo controller 152.

Figure 5:
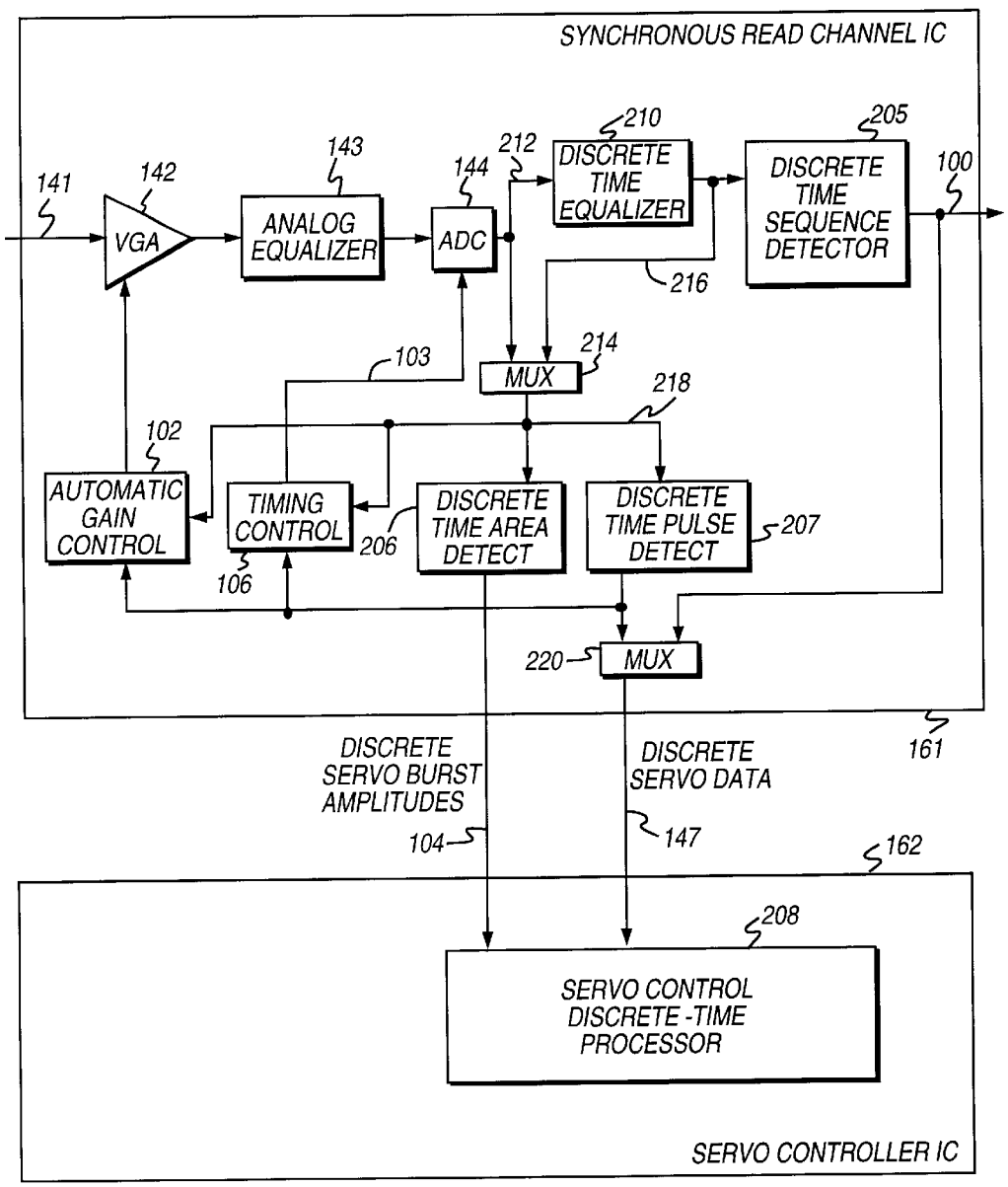
FIG. 5 illustrates a sampled amplitude read channel and associated servo controller in accordance with the discrete time servo demodulator circuit of the present invention wherein the read channel comprises a discrete time area detection circuit and discrete time pulse detection circuit for providing the servo controller with digital information representative of the servo burst and servo data, respectively, and wherein the servo controller need not incorporate an additional ADC circuit.

Referring now to FIG. 5, a sampled amplitude read channel 161 and associated servo controller 162 in accordance with the present invention is shown using discrete time servo demodulation which is more efficient for sampled amplitude read channels and further reduces the duplication of the corresponding portions of the ICs illustrated in FIG. 4. In a sampled amplitude read channel 161, the head signal 141 passes through a variable gain amplifier ("VGA") 142. The VGA 142 is controlled by an Automatic Gain Control circuit 102 which is responsive to a discrete time pulse detector 207. The VGA 142 adjusts the signal amplitude continuously while reading the user data and awhile processing the preamble for servo detection. The output of VGA 142 is applied to an analog equalizer 143 for application to ADC 144. The analog equalizer 143 filters the head signal into the desired response prior to sampling thereof by ADC 144. A Timing Control circuit 106, responsive to the discrete time pulse detector 207 and signal samples 218, generates a frequency control signal FCTL 103 to adjust the sampling frequency of the ADC 144 to the baud rate. A discrete time equalizer 210 further equalizes the signal samples into the desired response. A discrete time sequence detector 205, such as a DPD, DFE, EDFE, FDTS/DF, MLSD Viterbi sequence detector, processes the equalized signal samples to extract user data 100. The user data is then sent to a host system. Multiplexer 214 selects either the ADC output 212 or the discrete time equalizer output 216 as the input to a discrete time area detect circuit 206 and the discrete time pulse detector 207. Multiplexer 220 selects either the output of the pulse detector 207 or the user data 100 from the discrete time sequence detector 205 as the detected servo data 147 sent to the servo controller discrete time processor 208.

As can be observed, the ADC 149 of the conventional servo controller 152 in FIG. 4 is obviated by the present invention because the servo burst information is sampled, using the read channel ADC, and processed in discrete time. Consequently, the interface between the sampled amplitude read channel 161 and servo controller 162 is all digital. Another advantage illustrated is to detect the servo data 147 using the discrete time pulse detector 207 already provided in the sampled amplitude read channel 161 for timing and gain control. Thus, the analog pulse detection circuitry in conventional servo demodulation is also obviated. The only additional circuitry necessary to implement the servo demodulation technique of the present invention is a discrete time area detect circuit 206.

Servo Data Detection

Figure 6:
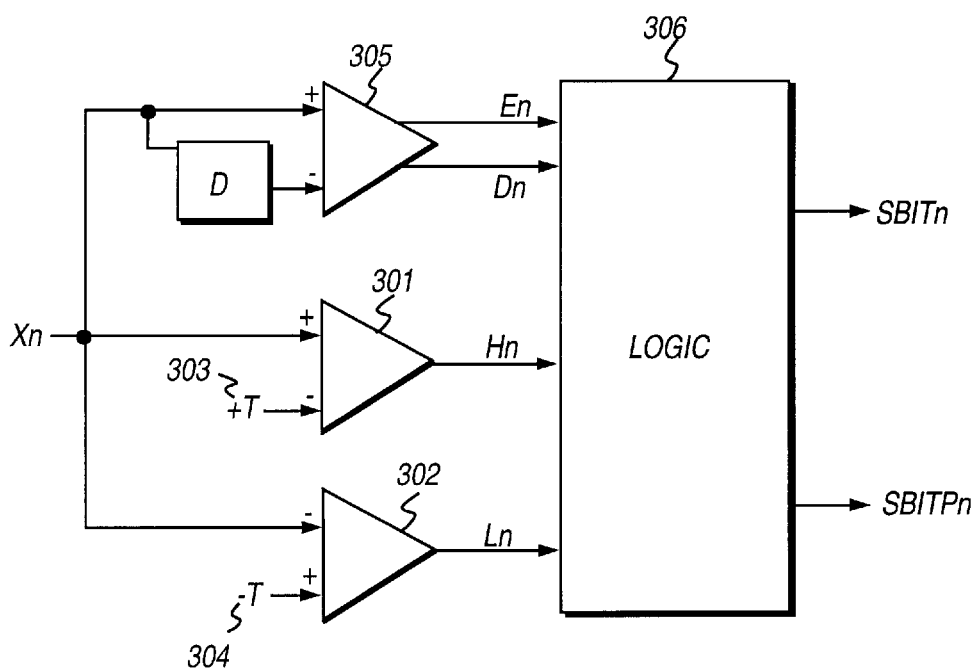
FIG. 6 is a functional block diagram of a peak detector circuit for use in conjunction with the discrete time servo demodulator of the present invention.

With reference now to FIG. 6, a pulse detector in accordance with the present invention for use in conjunction with the digital servo demodulator circuit is shown. The samples $X_n$ are supplied to the positive inputs of comparators 301 and 305 as well as to the negative input of comparator 302. A delayed sample is supplied to the negative input of comparator 305 as shown. The outputs of comparators 301, 302, and 305 are supplied to a logic block 306 to provide the signals $SBITP_n$ and $SBIT_n$ which correspond, respectively, to the presence and polarity of detected pulses.

The servo signal is sampled by the ADC 144 of the read channel 161 (shown in FIG. 5) at a rate faster (typically more than 4 times faster) than the rate of pulses in the servo data fields. ADC 144 samples, $X_n$, are compared to thresholds T+ 303 and T− 304 to create the bits $H_n$ and $L_n$, respectively. If the sample $X_n$ is greater than T+ 303 then $H_n$ is active. If, on the other hand, $X_n$ is less than T− 304 then $L_n$ is active. In addition, samples, $X_n$, are compared to the previous samples, $X_{n-1}$, to create the bits $E_n$ and $D_n$. If $X_n$ is greater than $X_{n-1}$ then $D_n$ is active. Alternatively, if $X_n$ is equal to $X_{n-1}$ then $E_n$ is active.

Figure 7:
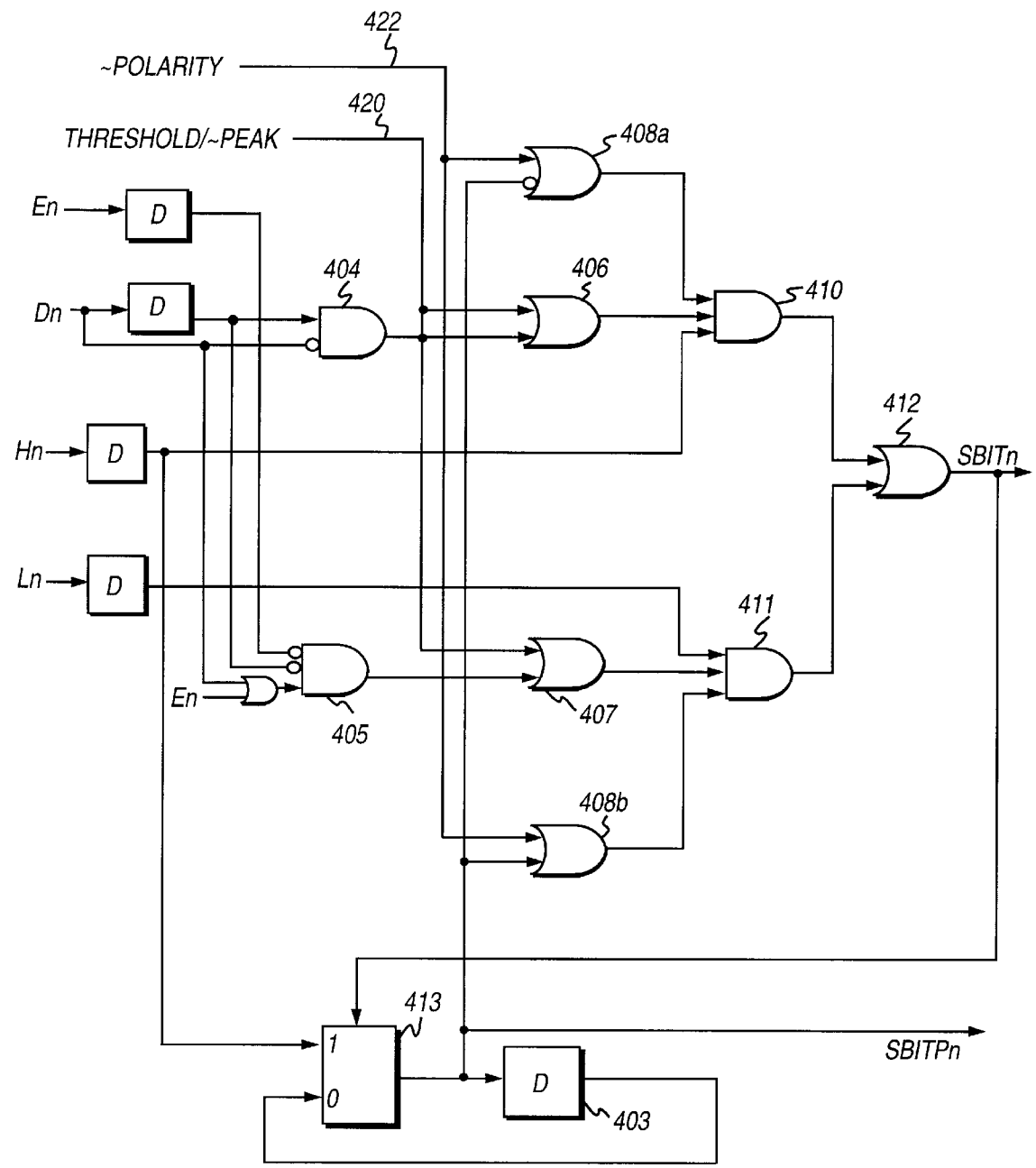
FIG. 7 is a more detailed logic block diagram of the peak detector operable to produce output data in one of four modes of operation.

The logic block 306 illustrated in FIG. 6 is shown in more detail in FIG. 7. The servo bit detector can operate in four modes. Mode 1: Peak detection with polarity qualification; Mode 2: Peak detection without polarity qualification; Mode 3: Threshold detection with polarity qualification; and Mode 4: Threshold detection without polarity qualification. The output data bits $SBITP_n$ and $SBIT_n$ are derived by the circuit of FIG. 7.

The signal $E_n$ is delayed through a delay element and applied to an inverting input of AND gate 405. Similarly, the signal $D_n$ is delayed through a delay element and applied to a non inverting input of AND gate 404 and an inverting input of AND gate 405. The signal $D_n$ is also directly supplied to an inverting input of AND gate 404 and a non-inverting input of AND gate 405.

The output of AND gate 404 is supplied as one input to OR gate 406 which has its other input coupled to a Threshold/~Peak signal 420. Threshold/~Peak signal 420 is also provided as an input to OR gate 407. The remaining input to OR gate 407 is taken at the output of AND gate 405. A ~Polarity signal 422 is supplied as one input to OR gate 408a and OR gate 408b. The outputs of OR gates 406 and 408a in conjunction with the delayed threshold signal $H_{n-1}$ are supplied as inputs to three input AND gate 410 which has its output coupled as one input to OR gate 412. In like manner, the outputs of OR gates 407 and 408b in conjunction with the delayed threshold signal $L_{n-1}$ are supplied as inputs to AND gate 411 having its output comprising the remaining input to OR gate 412.

The signal $H_n$ is delayed by one clock and then supplied as the first input to multiplexer ("mux") 413. The output of mux 413 is selected by the output of OR gate 412 $SBIT_n$. The output of mux 413 is coupled to a delay register 403 as shown with the signal $SBITP_n$ derived therebetween. The output of the delay register 403 is provided as the second input to mux 413. The signal $SBITP_n$ qualifies the outputs of OR gates 408a and 408b such that only peaks alternating in polarity are detected when in polarity qualification mode.

In operation, the output of AND gates 410 and 411 indicate the presence of a positive or negative pulse. The outputs of these gates are ORed 412 to generate the $SBIT_n$ signal indicating the presence of a pulse. In peak mode, positive and negative peaks are detected by AND gates 404 and 405 respectively. The logic equation for positive peak detecting AND gate 404 is:

+Peak=!$D_n$ AND $D_{n-1}$; or,

+Peak=!$(X_n>X_{n-1})$ AND $(X_{n-1}>X_{n-2})$.

The logic equation for negative peak detecting AND gate 405 is:

−Peak=!$E_{n-1}$ AND !$D_{n-1}$ AND $(D_n$ OR $En)$; or,

−Peak=!$(X_{n-1}==X_{n-2})$ AND !$(X_{n-1}>X_{n-2})$ AND !$(X_n<X_{n-1})$; or,

−Peak=$(X_{n-1}<X_{n-2})$ AND !$(X_n<X_{n-1})$.

Figure 8:
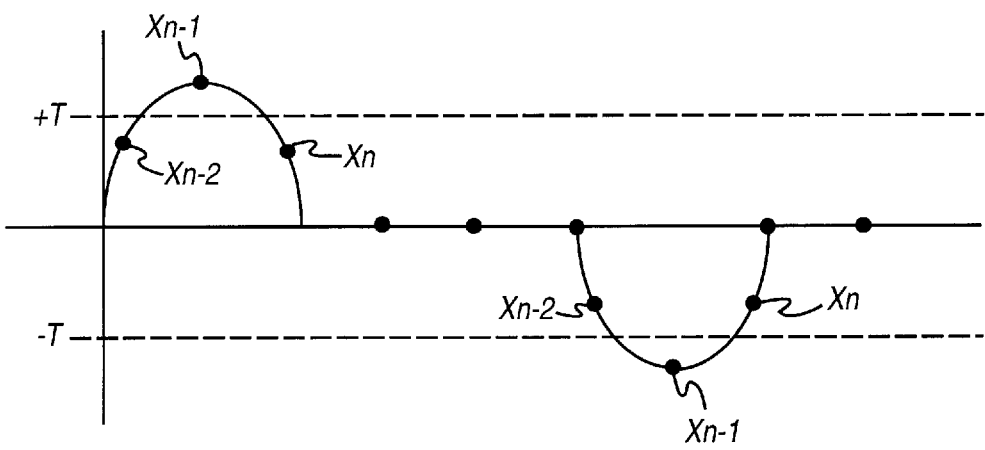
FIG. 8 illustrates the operation of the peak detector when processing the sampled analog signal from the magnetic read head.

From these equations, it is understood that a peak is only detected if there is a change of slope in the analog signal. This is illustrated in FIG. 8.

If Threshold/~Peak signal 420 is low (peak mode), then the peak signals from AND gates 404 and 405 are passed by OR gates 406 and 407. The peaks are qualified by thresholds $H_{n-1}$ and $L_{n-1}$ through pulse detecting AND gates 410 and 411. That is, a pulse will only be detected if $X_{n-1}$ exceeds the positive or negative threshold for a positive or negative peak, respectively, as shown in FIG. 8.

If Threshold/~Peak signal 420 is high (threshold detect mode), the outputs of OR gates 406 and 407 are always active, and the output of pulse detecting AND gates 410 and 411 are responsive only the threshold signals $H_{n-1}$ and $L_{n-1}$ and the polarity qualification signals from OR gates 408a and 408b.

If the ~Polarity signal 422 is low (polarity qualify mode), OR gates 408a and 408b pass the polarity signal $SBITP_n$ to AND gates 410 and 411 which will then detect pulses of alternating polarity only. If the ~Polarity signal 422 is high, the outputs of OR gates 408a and 408b are always active thereby disabling the polarity qualification mode.

The polarity qualification signal $SBITP_n$ is generated as follows. When a pulse is detected, the $SBIT_n$ signal is active and selects as output of mux 413 (which is also $SBITP_n$) the delayed threshold signal $H_{n-1}$. If the currently detected pulse is positive, then $H_{n-1}$ (and $SBITP_n$) is high and the expected polarity of the next pulse negative. Otherwise, $H_{n-1}$ (and $SBITP_n$) is low and the expected polarity of the next pulse positive. Delay register 403 stores the updated value of $SBITP_n$ until the next pulse is detected. The pulse detection AND gates 410 and 411 are enabled according to the expected polarity of the next pulse through OR gates 408a and 408b. That is, a positive or negative pulse will only be detected if the polarity of signal $SBITP_n$ is opposite in polarity of the pulse detected.

By oversampling (sampling faster than the baud rate), the detection of servo data is relatively insensitive to the phase and frequencies of the ADC 144 clock of the read channel 161 shown in FIG. 5. The flexibility of the detector modes provides good performance over a variety of conditions including servo data rates and filtering. Alternatively, the sequence detector 205 (commonly a Viterbi type sequence detector) of the sampled amplitude read channel 161 may be used to detect servo data at the baud rate in the same way user data is detected rather than using a pulse detector. Detecting the servo data with a sequence detector can be more accurate and more efficient, especially if the sampled amplitude read channel does not use a pulse detector.

Servo Burst Measurement

Figure 11:
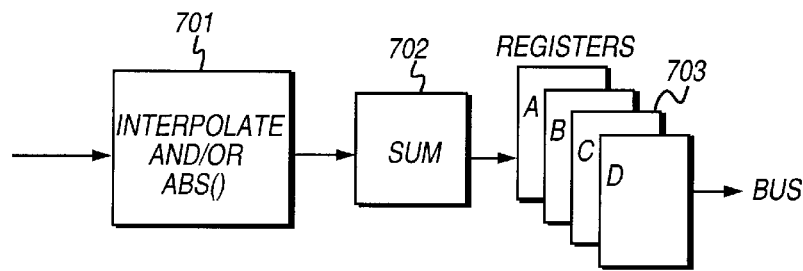
FIG. 11 is a simplified logic block diagram of a discrete time area detect circuit wherein the signal samples are first passed through a non-linearity block and then summed in an accumulator prior to being stored in a corresponding register.

With reference now to FIG. 11, a servo burst demodulator for use in conjunction with the present invention is shown. The servo burst demodulator comprises a nonlinearity circuit 701 for performing an absolute value (ABS) or interpolate function coupled to an accumulator 702, which in turn is coupled to a number of registers 703 designated A, B, C and D. In burst amplitude detection, the ADC 144 (shown in FIG. 5) signal samples are first passed through the nonlinearity circuit 701 and then summed in the accumulator 702. The resulting amplitude measurements are held in the register 703 depending on the burst selection signal $B_{sel}$.

The accumulation of samples tends to cancel errors due to ADC quantization. This quantization error is reduced with the number of signal samples accumulated leaving a residual error which appears similar to a small amount of added noise. However, this accumulated error is much less than the typical noise otherwise experienced in the data channel. The digital area detection technique of the present invention, therefore, has advantages over an alternative digital burst amplitude measurements with respect to noise immunity. Since noise in the signal samples is accumulated, and effectively averaged, the noise tends to cancel as in a low bandwidth filter. Thus, for typically strong signals, the noise performance of digital area detection is close to that of the theoretically optimum detector. Also, accumulating the burst amplitude signal samples increases the effective resolution of the channel ADC in proportion to the number of samples accumulated. In this manner, the resolution of the channel ADC (typically 6 bits) is effectively increased by 2 to 4 bits or more.

Still another advantage of a digital area detection technique is its relative insensitivity to direct current ("DC") offsets in a magnetic channel servo signal. Since the signal slope through the zero level is fairly high, a DC offset in the signals tends to add about as much area to half of the pulses as it subtracts from the other half giving a net zero change in measured amplitude to a first order approximation. Yet another advantage of a digital area detection technique is that it tends to de-emphasize the anomalous amplitude of one pulse by averaging many pulses in a burst. This is significantly better than a peak detection technique which can respond fully to a single anomalous pulse.

Figure 10A:
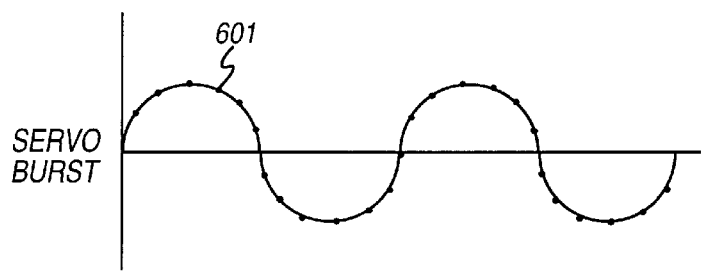
FIGS. 10A–10D illustrate a sampled servo burst signal and corresponding rectified burst samples, squared burst samples and interpolated burst samples respectively, useful for understanding the principles of the discrete time area detect circuit of the discrete time servo demodulator circuit of the present invention.
Figure 10B:
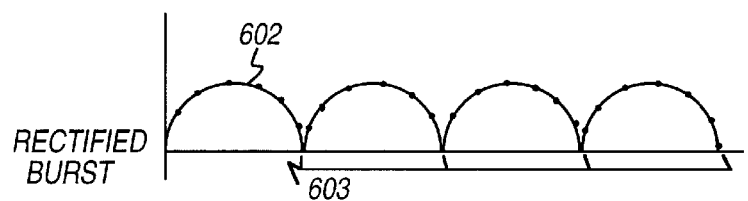

With reference now to FIGS. 10A–10D, the functionality of the digital servo demodulator circuit of the present invention is shown. In a basic area detection function, the ADC 144 (shown in FIG. 5) signal samples are full wave rectified by an absolute value operation and then accumulated. As shown in FIG. 10B, the rectified signal 602 has steep notches at zero crossing 603 of the servo burst 601 shown in FIG. 10A. With some sample rates, many signal samples can fall at the bottom of these notches or just outside of the notches giving significantly different burst amplitude measurements depending on the phase of the servo burst relative to the ADC 144 clock.

The digital servo demodulator circuit of the present invention incorporates a predetermined subset of five techniques overcoming this problem of sampling phase sensitivity: (a) control the sampling frequency relative to the burst frequency, (b) clock dither and frequency control, (c) squaring, (d) interpolation (e) and control of the accumulation window. Each technique tends to reduce the variation of the burst amplitude measurement with phase.

The simplest technique for reducing phase sensitivity is to control the sample frequency relative to the servo burst frequency so that only a few samples can line up with the zero crossings in a single servo burst. Nevertheless, this may not be practical in some disk drives since there are often limitations in the burst rates which may be written. Moreover, the servo burst frequency varies during read back with the angular velocity of the disk relative to the read/write head.

Figure 9:
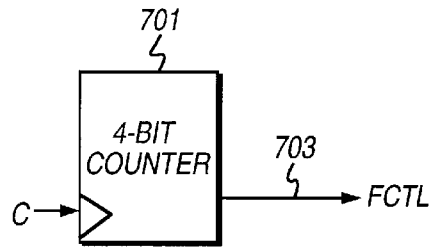
FIG. 9 is a simplified logic block diagram of a frequency dither circuit which allows the sampling frequency to be changed over a set of frequencies within a small fraction of a nominal sampling rate.

With reference additionally to FIG. 9, another technique which reduces phase sensitivity is to "dither" or "sweep" the ADC sampling frequency so that few samples can line up with the zero crossings in one servo burst. Utilizing this technique, the ADC 144 sampling frequency is changed over some set of frequencies within a small fraction of a nominal clock rate. If one of these frequencies allow samples to align with zero crossings, it only lasts for a short time and the number of unreliable samples is therefor minimized. Further, clock control tends to randomize the errors due to ADC quantization. This enhances the resolution improving effect of accumulating several sample values.

Dithering or sweeping the ADC 144 sampling frequency may be implemented as shown in FIG. 9 wherein a four-bit counter circuit 701 sequences through 16 binary states which are passed to the frequency control bus 703. This frequency control bus offsets the ADC 144 sampling frequency by a fractional amount based on a binary number representation.

Figure 10C:
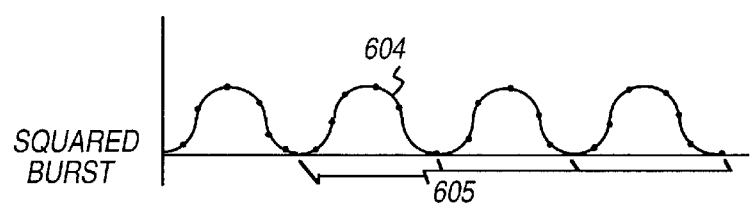

Referring specifically to FIG. 10C, another technique for reducing phase sensitivity is to use a squaring operation for rectifying the signal. Since the filtered servo burst is very near sinusoidal, after squaring, the signal 604 has the form of a sinusoid shifted so that its minimum value 605 is zero. Then, since the squared servo burst is accumulated for an integer number of cycles, the sinusoidal variation cancels (to the first order) leaving the average value which is proportional to the servo burst energy independent of the phase. One disadvantage of this technique is that it requires more data precision, more complicated circuitry for rectification, and may require a square root operation to be performed on the result. A further disadvantage of a squaring operation is that it can inadvertently emphasize noise.

Figure 12:
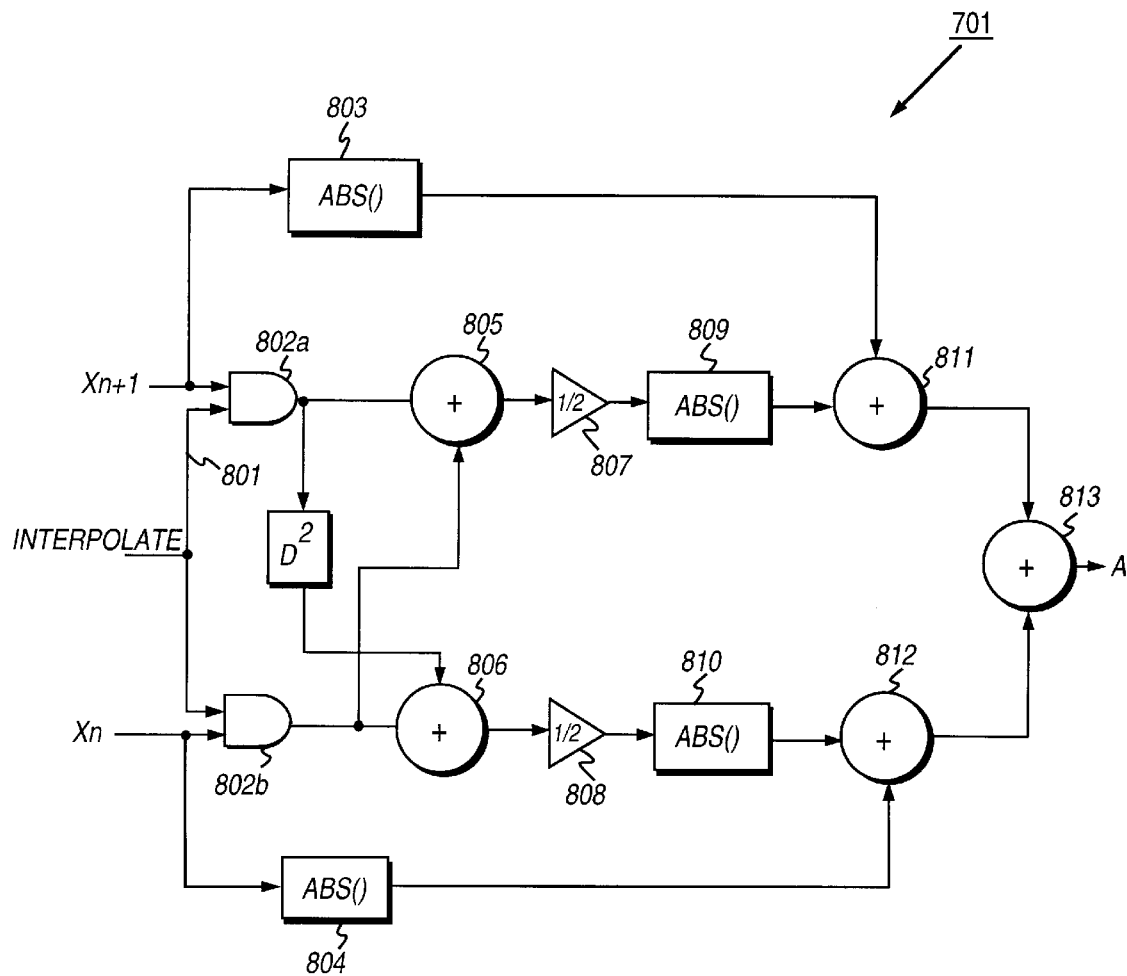
FIG. 12 is a logic block diagram of a portion of the discrete time area circuit of the present invention wherein all samples and interpolated samples are rectified and accumulated to produce a servo burst amplitude measurement with the signal samples being processed in parallel.

Referring now to the logic block diagram of FIG. 12, another technique for reducing phase sensitivity is interpolation. In this technique, consecutive samples are averaged to estimate the servo burst signal at the time between signal samples. Then all samples and interpolated samples are rectified an accumulated to produce a burst amplitude measurement.

As shown in FIG. 12, an ABS( ) or interpolate circuit 701 is shown. Circuit 701 comprises a pair of AND gates 802a and 802b to receive pairs of consecutive input samples $X_{n+1}$ and $X_n$ as well as an interpolate enable signal on line 801. Processing two samples at a time allows for half-rate sampling. The output of AND gate 802a is summed with the output of AND gate 802b in adder 805 and divided by two with a simple shifter 807. The output of shifter 807 is supplied to an abs( ) function logic block 809 for application to adder 811. Adder 811 takes the sample $X_{n+1}$ through the absolute value operator function block 803 and provides it as one input to adder 813.

In like manner, the output of AND gate 802b is summed with the delayed output of AND gate 802a in adder 806 for division by two through shifter 808 for application to abs( ) function logic block 810 and subsequent application to adder 812. Adder 812 has as an additional input the signal $X_n$ as received through the absolute value operator function block 804. The output of adder 812 provides the second input to adder 813 to produce the area signal "A."

As shown in this figure, signal samples are processed in parallel. When the "interpolate" signal on line 801 is inactive, the AND gates 802a and 802b block the input signals and the output of the inner "abs" operators 809 and 810 are zero. Then, the signal samples $X_{n+1}$ and $X_n$ are rectified by the absolute value operators 803 and 804 and summed by the adders 811 and 812. This result is accumulated for a fixed even number of clock cycles. When the "interpolate" signal on line 801 is active, the AND gates 802a and 802b pass the signal samples to the interpolator.

In the upper branch, the signal samples $X_{n-1}$ and $X_n$ are summed by the adder 805 and divided by two with a simple shifter 807. The resulting interpolated sample is rectified at block 809 and added to the non-interpolated signal in adder 811. Likewise, in the lower branch, signal sample $X_n$ is added to the delayed signal $X_{n-1}$ (that is, $X_{n-1}$) in adder 806 and is divided by two in the shifter 808. The resulting interpolated sample is rectified in block 810 and added to the non-interpolated sample $X_n$ in adder 812. The two sums are then added in adder 813 giving an output which is the sum of two rectified samples and two rectified interpolated samples.

Figure 10D:
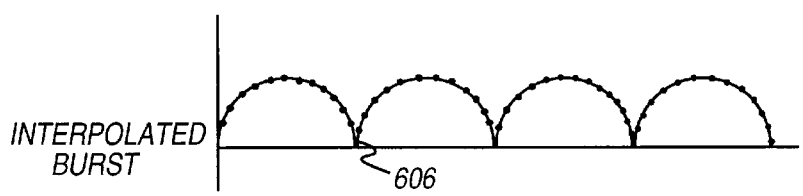

The results of interpolating before rectification is that more samples are accumulated near the servo burst zero crossings filling in the notches shown in FIG. 10D. This is close to the same result as if the signal were sampled at twice the rate. Since more samples appear in the notches of the rectified servo burst, the signal is more accurately represented and the resulting servo burst amplitude varies less with sampling phase. This technique has the advantage of simpler circuitry than squaring along with better noise performance. Therefore, the preferred implementation of digital area detection uses interpolation to reduce phase sensitivity along with frequency control and dither. This combination of techniques is relatively simple to implement in accordance with the present invention and provides robust performance.

Figure 13:
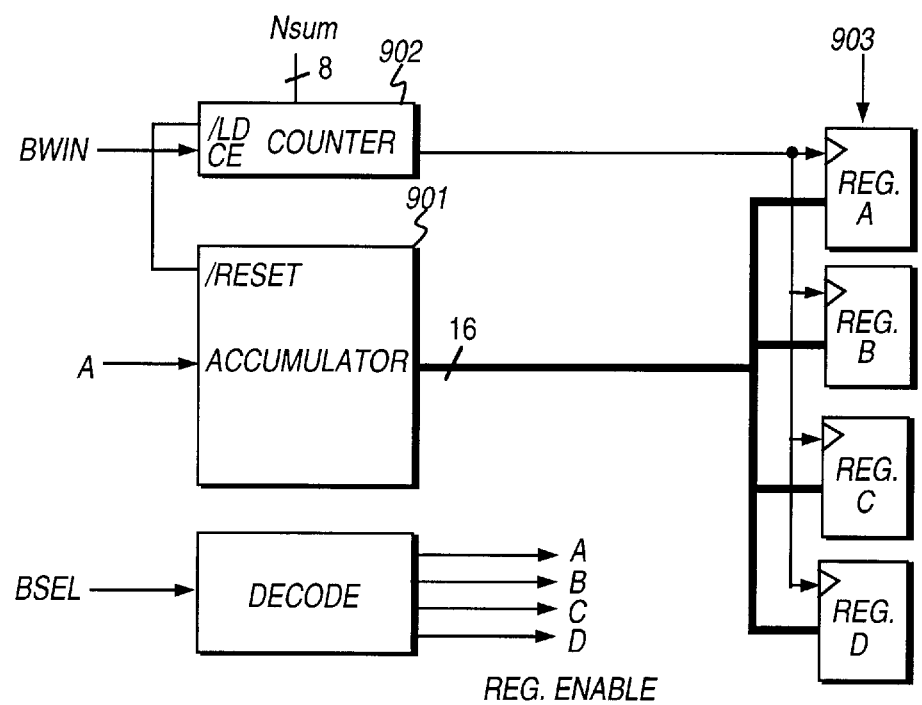
FIG. 13 is a simplified logic block diagram of a servo burst accumulator in accordance with the present invention for use in conjunction with the discrete time area detection circuit.

With reference additionally now to FIG. 13, another effect which causes variation of the servo burst amplitude measurement with sampling phase is the alignment of the accumulation window with the servo burst signal. If the accumulation does not include exactly an integer number of pulses (that is, half-cycles), then the measurement will change depending on the exact alignment or phase. This problem may be mitigated by triggering the beginning of accumulation by the signal "BWIN" after the servo burst signal has had time to reach steady state and appear sinusoidal. Then, the servo burst amplitude circuit accumulates for a predetermined period of time which is very close to an integer number of servo pulse periods.

Referring now to FIG. 13, the digital area detect circuit accumulates rectified samples in accumulator 901 immediately after the signal "BWIN" is made active. Also, counter 902 begins counting accumulation clocks at this time, starting at zero. Then, accumulation continues until the counter 902 reaches a programmed count number. At this time, the resulting accumulation is stored in one of the registers 903, depending on the value of the signal "BSEL". This process repeats until all servo bursts in the present field are measured. The servo burst amplitude measurements may then be read by the servo controller 162 (shown in FIG. 5) from the registers 903. This may be accomplished with a parallel or serial digital interface (not shown).

Disclosed herein is a discrete time servo demodulator circuit integrated within a read channel IC and interfaced to a servo controller system of a computer mass storage device utilizing a rotating storage medium having a plurality of information tracks thereon. The read channel IC includes a signal conditioning section for supplying a signal from a data transducer indicative of information contained on a selected track of the rotating storage medium to a discrete time sample generator coupled to a maximum likelihood Viterbi sequence detector to extract data therefrom.

The servo control system includes a servo control processor and a servo system responsive thereto for positioning the data transducer with respect to the selected track. The plurality of tracks include data field and servo field information recorded thereon, wherein the servo field information includes servo data and servo burst portions thereof.

The improvement in combination herein disclosed comprises a discrete time sample detection subsystem incorporated within a sampled amplitude read channel for supplying digital servo signals representative of the servo data and servo burst portions of the servo field information to the servo control processor. In a particular embodiment, the discrete time sample detection subsystem may comprise a digital pulse detection circuit for supplying first signals representative of the servo data portion of the servo field information to the servo control processor and a digital area detection circuit for supplying second signals representative of the servo burst portion of the servo field information to the servo control processor.

The particular embodiment disclosed is not intended to limit the scope of the present invention. Many changes in form and detail could be made without departing from the spirit and scope of the invention. The intended scope is properly construed from the following claims.

We claim:

1. A discrete time area detector used in a sampled amplitude read channel, responsive to a sequence of discrete time sample values generated by sampling pulses in an analog signal representative of digital data stored on a magnetic medium, the analog signal being generated by reading the medium using a magnetic read/write head, the digital data comprises a plurality of servo bursts wherein each servo burst comprises a plurality of pulses, the servo bursts used to control an electromechanical servo system for positioning the read/write head with respect to the medium, the discrete time area detection circuit comprising:

(a) a means for receiving the discrete time sample values;

(b) a rectifier for generating a rectified sequence of sample values proportional to the absolute magnitude of the discrete time sample values of the analog signal;

(c) an accumulator for accumulating a predetermined number of the rectified sample values representative of one of the plurality of servo bursts; and (d) a discrete time output for outputting a discrete time servo control signal indicative of an area of the pulses representing a servo burst.

2. The discrete time area detector as recited in claim 1 further comprising a plurality of registers, corresponding to the plurality of servo bursts, for storing the accumulated sample values representing each servo burst.

3. The discrete time area detector as recited in claim 1, wherein sampling the pulses in the analog signal to generate the discrete time sample values occurs at a varying sampling phase, further comprising a means for reducing a sensitivity in the area detector to the sampling phase.

4. The discrete time area detector as recited in claim 3, wherein the means for reducing the sensitivity to the sampling phase comprises controlling the accumulation of the rectified samples to accumulate a predetermined number of rectified sample values representing substantially an integer number of pulses to reduce variations in the burst area measurement.

5. The discrete time area detector as recited in claim 3, wherein the means for reducing the sensitivity to the sampling phase comprises a squarer for squaring the discrete time sample values to reduce the number of rectified sample values occurring in notches of the servo burst pulses.

6. The discrete time area detection circuit as recited in claim 3, wherein the means for reducing the sensitivity to the sampling phase comprises an interpolator for interpolating the discrete time sample values to ensure more accumulated sample values occur in notches of the servo burst pulses.

7. The discrete time area detection circuit as recited in claim 6, wherein:

(a) the interpolator averages consecutive discrete time sample values to generate an interpolated sample value; and (b) the accumulator accumulates the interpolated sample values in addition to the rectified discrete time sample values.

8. The discrete time area detector as recited in claim 3, further comprising a sampling device for sampling the analog signal at an adjustable frequency, wherein:

(a) the pulses comprising the servo burst occur at a predetermined burst pulse frequency; and (b) the means for reducing the sensitivity to the sampling phase comprises a means for controlling the sampling frequency relative to the burst pulse frequency to reduce the number of rectified sample values occurring in notches of the servo burst pulses.

9. The discrete time area detector as recited in claim 3, further comprising a sampling device for sampling the analog signal at an adjustable sampling frequency, wherein the means for reducing the sensitivity to the sampling phase comprises dithering the sampling frequency about a predetermined nominal frequency to reduce the number of rectified sample values occurring in notches of the servo burst pulses.

10. A method for reading digital data from a sequence of discrete time sample values generated by sampling pulses in an analog read signal emanating from a magnetic read/write head positioned over a magnetic storage medium, the digital data comprising a plurality of servo bursts wherein each servo burst comprises a plurality of pulses, the servo bursts used to control an electromechanical servo system for positioning the read/write head with respect to the medium, comprising the steps of:

(a) sampling the analog read signal to generate the discrete time sample values;

(b) generating a rectified sequence of sample values proportional to an absolute magnitude of the discrete time samples of the analog read signal;

(c) accumulating a predetermined number of the rectified sample values representative of one of the plurality of servo bursts; and (d) outputting a discrete time servo control signal indicative of an area of the pulses representing a servo burst.

11. The method for reading digital data as recited in claim 10, further comprising the step of accumulating sample values representing each servo burst in a plurality of respective registers.

12. The method for reading digital data as recited in claim 10, wherein the step of sampling the pulses in the analog read signal to generate the discrete time sample values occurs at a varying sampling phase, further comprising the step of reducing a sensitivity to the sampling phase.

13. The method for reading digital data as recited in claim 12, wherein the step of reducing the sensitivity to the sampling phase comprises the step of accumulating a predetermined number of rectified sample values representing substantially an integer number of pulses to reduce variations in the burst area measurement.

14. The method for reading digital data as recited in claim 12, wherein the step of reducing the sensitivity to the sampling phase comprises the step of squaring the discrete time sample values to reduce the number of accumulated sample values occurring in notches of the servo burst pulses.

15. The method for reading digital data as recited in claim 12, wherein the step of reducing the sensitivity to the sampling phase comprises the step of interpolating the discrete time sample values to ensure more accumulated sample values occur in notches of the servo burst pulses.

16. The method for reading digital data as recited in claim 15, wherein:

(a) the step of interpolating comprises the step of averaging consecutive discrete time sample values to generate interpolated sample values; and (b) the step of accumulating accumulates the interpolated sample values and the rectified sample values.

17. The method for reading digital data as recited in claim 12, further comprising the step of sampling the analog signal at a variable frequency, wherein:

(a) the pulses comprising the servo burst occur at a predetermined burst pulse frequency; and (b) the step of reducing the sensitivity to the sampling phase comprises the step of controlling the sampling frequency relative to the burst pulse frequency to reduce the number of accumulated sample values occurring in notches of the servo burst pulses.

18. The method for reading digital data as recited in claim 12, further comprising the step of sampling the analog signal at a variable sampling frequency, wherein the step of reducing the sensitivity to the sampling phase comprises the step of dithering the sampling frequency about a predetermined nominal frequency to reduce the number of accumulated sample values occurring in notches of the servo burst pulses.

19. A sampled amplitude read channel, responsive to a sequence of discrete time sample values generated by sampling pulses in an analog read signal representative of digital data stored on a magnetic medium, the analog read signal generated by reading the medium using a magnetic read/write head, the digital data comprising a plurality of servo bursts wherein each servo burst comprises a plurality of pulses, the servo bursts used to control an electromechanical servo system for positioning the read/write head with respect to the medium, the sampled amplitude read channel comprising:

(a) an input for receiving the discrete time sample values;

(b) an accumulator for accumulating a predetermined number of the sample values representative of one of the plurality of servo bursts; and (c) a discrete time output for outputting a discrete time servo control signal indicative of an area of the pulses representing a servo burst.

20. The sampled amplitude read channel as recited in claim 19, further comprising an interpolator for interpolating the sample values to ensure more accumulated sample values occur in notches of the servo burst pulses, wherein the accumulator further accumulates the interpolated sample values.

21. A sampled amplitude read channel for detecting user data and servo data stored on a disk storage medium from a sequence of discrete time sample values generated by sampling pulses in an analog read signal, wherein: the servo data comprises a plurality of servo bursts and each servo burst comprises a plurality of pulses, the servo bursts are used to control an electromechanical servo system for positioning a recording head with respect to the disk storage medium, and the user data is recorded at a predetermined baud rate, the sampled amplitude read channel comprising:

(a) a sampling device for sampling the analog read signal asynchronous to the baud rate to generate asynchronous sample values representing the servo bursts;

(c) an accumulator for accumulating a predetermined number of the asynchronous sample values representing one of the servo bursts; and (d) a discrete time output for outputting a discrete time servo control signal indicative of an area of the pulses representing the servo burst.

22. The sampled amplitude read channel as recited in claim 21, further comprising a plurality of registers, corresponding to the plurality of servo bursts, for storing the accumulated sample values representing each servo burst.

23. The sampled amplitude read channel as recited in claim 21, wherein sampling the pulses in the analog signal to generate the discrete time sample values occurs at a varying sampling phase, further comprising a means for reducing a sensitivity to the sampling phase.

24. The sampled amplitude read channel as recited in claim 23, wherein the means for reducing the sensitivity to the sampling phase comprises controlling the accumulation of the rectified samples to accumulate a predetermined number of rectified sample values representing substantially an integer number of pulses to reduce variations in the burst area measurement.

25. The sampled amplitude read channel as recited in claim 23, wherein the means for reducing the sensitivity to the sampling phase comprises a squarer for squaring the discrete time sample values to reduce the number of accumulated sample values occurring in notches of the servo burst pulses.

26. The sampled amplitude read channel as recited in claim 23, wherein the means for reducing the sensitivity to the sampling phase comprises an interpolator for interpolating the discrete time sample values to ensure more accumulated sample values occur in notches of the servo burst pulses.

27. The sampled amplitude read channel as recited in claim 26, wherein:
   (a) the interpolator averages consecutive discrete time sample values to generate interpolated sample values; and
   (b) the accumulator accumulates the interpolated sample values and the rectified sample values.

28. The sampled amplitude read channel recited in claim 23, further comprising a sampling device for sampling the analog signal at an adjustable frequency, wherein:
   (a) the pulses comprising the servo burst occur at a predetermined burst pulse frequency; and
   (b) the means for reducing the sensitivity to the sampling phase comprises a means for controlling the sampling frequency relative to the burst pulse frequency to reduce the number of accumulated sample values occurring in notches of the servo burst pulses.

29. The sampled amplitude read channel as recited in claim 23, further comprising a sampling device for sampling the analog signal at an adjustable sampling frequency, wherein the means for reducing the sensitivity to the sampling phase comprises dithering the sampling frequency about a predetermined nominal frequency to reduce the number of accumulated sample values occurring in notches of the servo burst pulses.

* * * * *